Patented May 15, 1945

2,376,015

UNITED STATES PATENT OFFICE 2,376,015

POLYMERIZATION OF UNSATURATED ORGANIC COMPOUNDS CONTAINING A $CH_2=C<$ GROUP

Waldo L. Semon, Silver Lake, Ohio, assignor to The B. F. Goodrich Company, New York, N. Y., a corporation of New York No Drawing. Application June 26, 1941, Serial No. 399,939

10 Claims. (Cl. 260—84.5)

This invention relates to the polymerization of unsaturated organic compounds which are capable of undergoing an addition polymerization to form high molecular weight linear polymers, particularly butadienes and mixtures of butadienes with other unsaturated compounds copolymerizable therewith. More specifically, this invention relates to new initiators of polymerization and to the improved rubber-like or resinous products obtained when polymerization is effected in presence of such new initiators.

It is well known that the course of addition polymerizations which yield high molecular weight linear polymers and the quality and usefulness of the polymers produced are determined largely by the nature of the substances present along with the monomeric materials during the polymerization process. In practically all such addition polymerizations, for example, whether carried out in a homogeneous system or in emulsion, the presence of an initiator of polymerization, that is, a substance which by some chemical action causes the polymerization to begin, is essential to completion of the process in a reasonably short time and at a reasonably low temperature. Oxygen-containing compounds such as hydrogen peroxide, benzoyl peroxide and persalts have heretofore been almost universally employed for this purpose. When such oxygen-containing initiators are used, however, these compounds may also function to oxidize the linear polymer as it is produced and thereby increase its degree of cross-linking or decrease its chain length both of which are extremely undesirable because of their deleterious effect on the properties of the polymer. In the polymerization of butadienes and monomer mixtures containing a butadiene it is especially important that the product be substantially free of cross-linked structures since these render the polymers hard and unworkable. Accordingly, for many purposes, it is desirable to utilize compounds other than oxygen-containing compounds as initiators of polymerization. The principal object of this invention is to provide such new initiators.

In accordance with this invention aliphatic substituted triazenes are employed as initiators for the polymerization of unsaturated organic compounds which undergo addition polymerizations to form high molecular weight linear polymers. These new initiators enable polymerizations to be carried out in good yield in a relatively short time and also improve the properties of polymers formed in their presence over those prepared using the known initiators.

The compounds employed as polymerization initiators in this invention are aliphatic substituted triazene derivatives, that is, they are derivatives of the parent compound triazene $$HN=N-NH_2$$
$$\phantom{HN}1\phantom{=N-}2\phantom{-N}3$$

in which at least one of the hydrogen atoms is substituted by an aliphatic residue. Thus, there may be aliphatic substituents such as alkyl, alkoxy, or aliphatic acyl groups or the like at either the 1 or 3 positions. If any hydrogen atom remains unsubstituted, aromatic substituents such as aryl and substituted aryl groups may replace this hydrogen provided, of course, that at least one of the other hydrogens is substituted with an aliphatic group. As examples of compounds in this class there may be mentioned the aliphatic substituted triazenes containing only alkyl substituents such as 1-methyl triazene, 1-ethyl triazene, 1-3 dimethyl triazene, 1-methyl 3-ethyl triazene, 1-propyl 3-methyl triazene, 1-3 diethyl triazene, 1-ethyl 3-3 dimethyl triazene and the like; the aliphatic substituted triazenes containing both alkyl and other aliphatic substituents such as 1-methyl 3-methoxy triazene, 1-methyl 3-acetyl triazene and the like; aliphatic aromatic triazenes containing only alkyl and aryl substituents such as 1-phenyl 3-methyl triazene, 1-phenyl 3-3 dimethyl triazene, 1-3 diphenyl 3-methyl triazene, 1 (p-tolyl) 3-methyl triazene, 1-phenyl 3-ethyl triazene, 1-naphthyl 3-methyl triazene, 1-3 (bis p-ethyl phenyl) 3-methyl triazene, 1-3 diphenyl 3-propyl triazene and the like; and aliphatic aromatic triazenes which may contain other aromatic or aliphatic substituents such as 1-3 diphenyl 3-acetyl triazene, 1- phenyl 3-methyl 3-acetyl triazene, 3-acetyl 1-phenyl triazene, 1-(p bromo phenyl) 3-methyl triazene, 1-3 (bis 2-5 dichlorophenyl) 3-methyl triazene, 3-methyl 3-methoxy 1-phenyl triazene and the like.

As has already been mentioned, these initiators may be employed in the polymerization of unsaturated organic compounds which are capable of undergoing an addition polymerization to form a linear polymer. The principal types of unsaturated compounds which form linear polymers are the vinyl type compounds and the butadienes but, in general, other unsaturated compounds containing the polymerizable structure

where at least one of the dangling valencies is connected to an electron attracting group, that is a group which substantially increases the electrical dissymmetry or polar character of the molecule also possesses this property. Two or more monomers in admixture which are capable of forming linear polymers and which are capable of copolymerizing with one another may also be employed as the polymerizable material. Thus, the monomeric material may be a butadiene by which is meant butadiene-1,3 and its homologs and analogs which polymerize in essentially the same manner such as isoprene, 2,3-dimethyl butadiene, piperylene, chloroprene, and the like, by itself, or may be a mixture of butadienes, or a mixture containing one or more butadienes and one or more other unsaturated compounds which are copolymerizable therewith, among which are, for example, aryl olefins such as styrene, vinyl naphthalene, and their chloro or alkoxy substituted derivatives; alpha methylene carboxylic acids and their esters, nitriles, amides and the like such as acrylic acid, methacrylic acid, methyl acrylate, methyl methacrylate, ethyl methacrylate, methyl ethacrylate, butyl acrylate, isobutyl methacrylate, acrylonitrile, methacrylonitrile, ethacrylonitrile, acrylamide, methacrylamide and the like; and other unsaturated polymerizable compounds such as vinylidene chloride, methyl vinyl ether, methyl vinyl ketone, vinyl furane, vinyl ethinyl alkylcarbinols, vinyl acetylene, isobutylene and other unsaturated hydrocarbons, esters, ketones, acids, alcohols, ethers and the like. The initiators of this invention are especially suitable for use in the polymerization of these monomeric materials containing a butadiene as one of the essential constituents and are even more suitable when the butadiene is the predominant constituent and a rubber-like material is obtained as the product, but they may also be used in the polymerization of monomeric materials not containing a butadiene but which do contain one or more of the unsaturated compounds mentioned above as being copolymerizable with butadienes such as styrene, etc., or other vinyl type compounds such as vinyl chloride, vinyl acetate or the like.

In the practice of the invention the aliphatic substituted triazene is added to the monomeric material and the monomeric material is then copolymerized by any of the well known methods of forming linear polymers such as by polymerization in homogeneous systems or by polymerization in aqueous emulsion. In the emulsion polymerization process which is at present preferred the monomeric material is emulsified with water by the use of a suitable emulsifying agent such as a fatty acid soap or a synthetic saponaceous material, and polymerization is then effected by adding the initiator and agitating the emulsion at a temperature from about 20 to 50° C. until polymer is formed, this usually requiring from about 10 to 100 hours. This process yields a latex-like dispersion which may be coagulated to yield the solid polymer. Polymerization may also be effected in a homogeneous system as by heating the monomeric material or a solution thereof containing the polymerization initiator.

The amount of the aliphatic substituted triazene used in the polymerization process may be varied considerably and is not critical but, in general, only small amounts of the initiator should be employed. For most purposes amounts varying from 0.2 to 2% of the initiator based on the total weight of the monomeric materials being polymerized are most effective. When the initiator is added in such amounts highest yields and best quality products are obtained.

As a specific example of one method of carrying out this invention a mixture of butadiene-1,3 and acrylonitrile is polymerized in aqueous emulsion the charge being made up as follows:

|  | Parts |
|---|---|
| Butadiene-1,3 | 75 |
| Acrylonitrile | 25 |
| Emulsifying solution (3% aqueous solution of a fatty acid soap) | 250 |
| 1-phenyl 3-3 dimethyl triazene | 0.5 |

The emulsion is agitated at a temperature of 30° C. for 48 hours, at the end of this time the polymerization being complete. Coagulation of the latex-like dispersion resulting from this process yields a plastic, tacky, rubber-like copolymer. When this copolymer is compounded in a typical tire tread recipe and vulcanized, vulcanizates having high tensile strength and ultimate elongation are obtained. When employing hydrogen peroxide as the initiator in the above example, a rubber-like copolymer is obtained which is considerably less plastic and tacky and more difficult to mill. The vulcanizates prepared from the copolymers obtained using hydrogen peroxide as the initiator are also inferior to those prepared from the copolymer obtained in accordance with this invention. If no initiator is employed in the above recipe, the polymerization requires over 150 hours and only a low yield of an inferior product results.

As another embodiment of this invention a mixture of 75 parts of butadiene-1,3 and 25 parts of acrylonitrile are polymerized in aqueous emulsion using sodium lauryl sulfate solution as the emulsifying agent and 0.5 part of 1-3 diphenyl 3-methyl triazene as the initiator. An excellent rubber-like copolymer is obtained in 48 hours at 40° C. The oxygen-containing initiators do not produce good polymers in this short time when employed in acidic emulsions such as are obtained with sodium lauryl sulfate.

Similar results may be obtained by the use of other aliphatic triazene derivatives and when polymerizing other monomeric materials. In addition, it is to be understood that many other substances may be employed in the polymerization recipe without destroying the effect of the initiators herein disclosed. Thus, modifiers of polymerization, accelerators of polymerization, catalysts of polymerization and other initiators of polymerization as well as substances which exert some other effect on the course of the polymerization or on the properties of the products such as softeners or stabilizers for the product, may be added together with the monomeric materials and the initiators of this invention either before, after or during the polymerization, if desired, the effect being that each substance functions in its own way to improve the process or the products. It is also to be understood that the method and conditions of polymerization may be varied. Accordingly, the invention is not intended to be limited except by the spirit and scope of the appended claims.

I claim:

1. In a process of polymerizing a monomeric unsaturated organic compound which undergoes an addition polymerization to form a high molecular weight linear polymer and which contains the structure

wherein at least one of the disconnected valencies is attached to an electron attracting group, the step which comprises adding an aliphatic substituted triazene to the monomeric unsaturated compound before polymerization.

2. In a process of polymerizing a monomeric mixture of a conjugated butadiene and an unsaturated organic compound which contains a

group and is copolymerizable therewith, the step which comprises adding an aliphatic substituted triazene to the monomeric material before polymerization.

3. In a process of polymerizing a monomeric mixture of a conjugated butadiene and an aryl olefin, the step which comprises adding an aliphatic substituted triazene to the monomeric material before polymerization.

4. In a process of polymerizing a monomeric mixture of a conjugated butadiene and an alpha methylene carboxylic acid nitrile, the step which comprises adding an aliphatic substituted triazene to the monomeric material before polymerization.

5. In a process of polymerizing a monomeric mixture of a conjugated butadiene and an alpha methylene carboxylic acid ester, the step which comprises adding an aliphatic substituted triazene to the monomeric material before polymerization.

6. In a process of polymerizing a monomeric mixture of a conjugated butadiene and an unsaturated organic compound which contains a

group and is copolymerizable therewith, the step which comprises adding a substituted triazene wherein at least one of the hydrogen atoms of triazene is substituted by an aliphatic radical and at least one other of the hydrogen atoms is substituted by an aromatic radical, to the monomeric mixture before polymerization.

7. In a process of polymerizing a monomeric mixture of a conjugated butadiene and an unsaturated organic compound which contains a

group and is copolymerizable therewith, the step which comprises adding a substituted triazene wherein at least one of the hydrogen atoms of triazene is substituted by an alkyl radical and at least one other of the hydrogen atoms is substituted by an aryl radical, to the monomeric mixture before polymerization.

8. In a process of polymerizing a monomeric mixture of butadiene-1,3 and styrene, the step which comprises adding 1-phenyl 3-3 dimethyl triazene to the monomeric mixture before polymerization.

9. In a process of polymerizing a monomeric mixture of butadiene-1,3 and acrylonitrile, the step which comprises adding 1-3 diphenyl 3-methyl triazene to the monomeric mixture before polymerization.

10. In a process of polymerizing a monomeric mixture of butadiene-1,3 and methyl methacrylate, the step which comprises adding 1-3 diphenyl 3-methyl triazene to the monomeric mixture before polymerization.

WALDO L. SEMON.